(No Model.)  T. C. DODSWORTH.  2 Sheets—Sheet 1
CULTIVATOR.
No. 258,724.  Patented May 30, 1882.
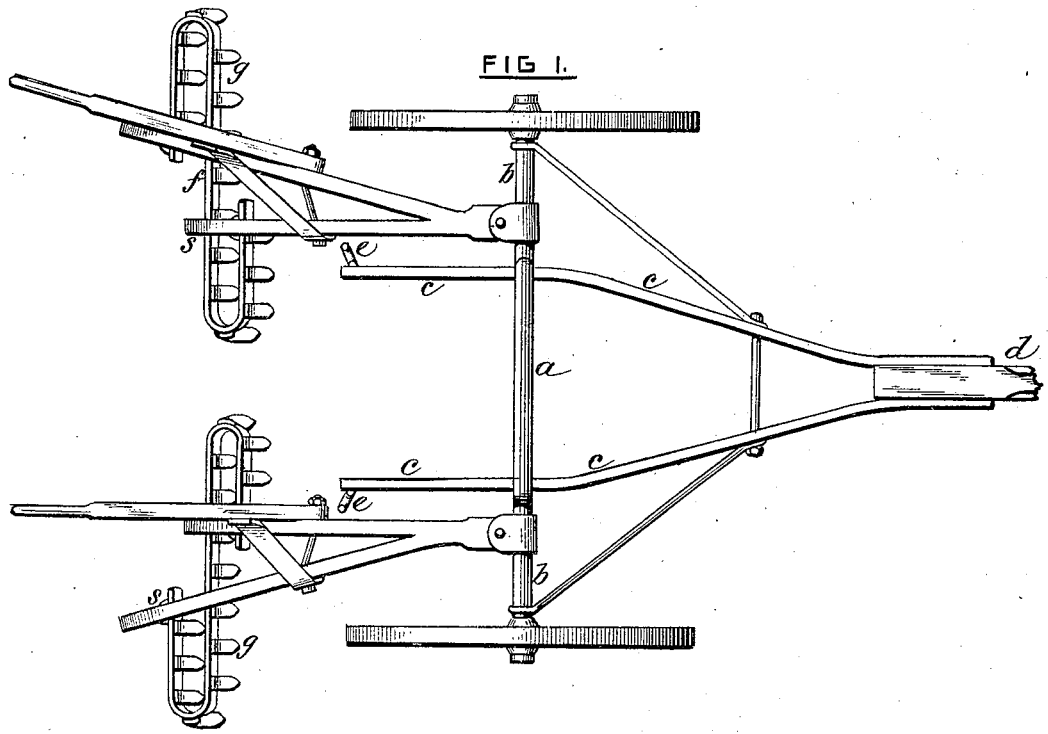
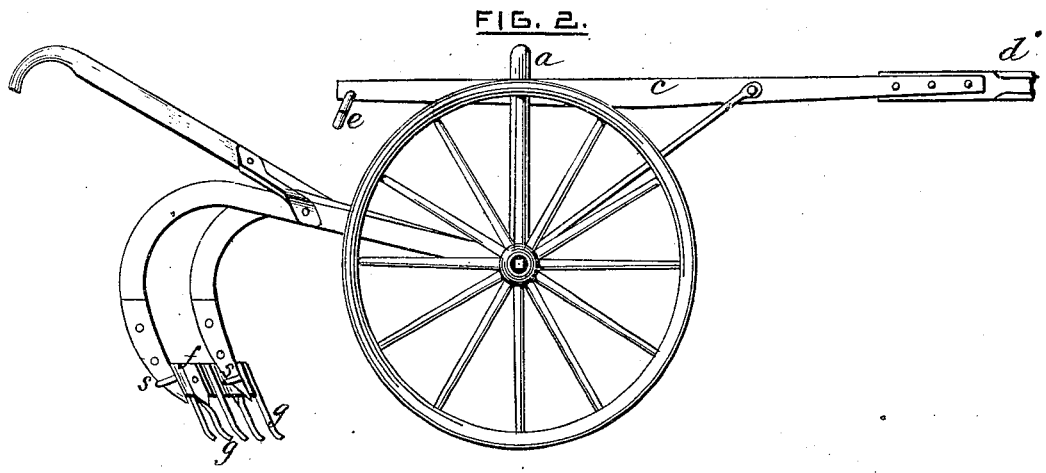
WITNESSES:  INVENTOR:

(No Model.) 2 Sheets—Sheet 2.
T. C. DODSWORTH.
CULTIVATOR.
No. 258,724. Patented May 30, 1882.
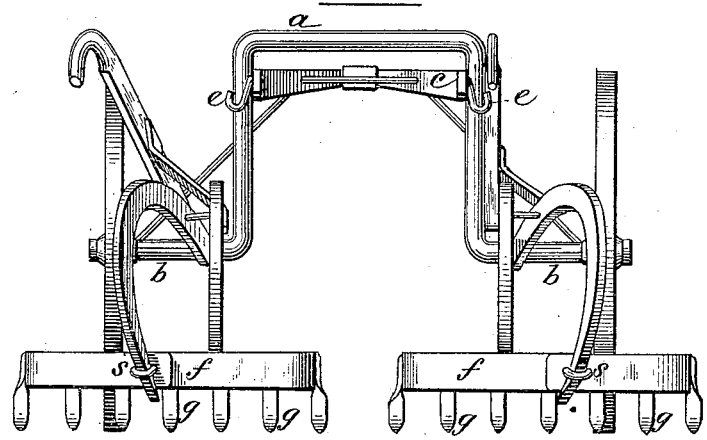
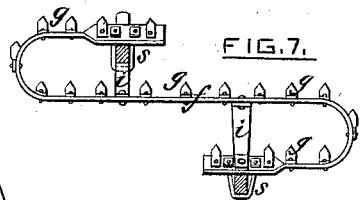
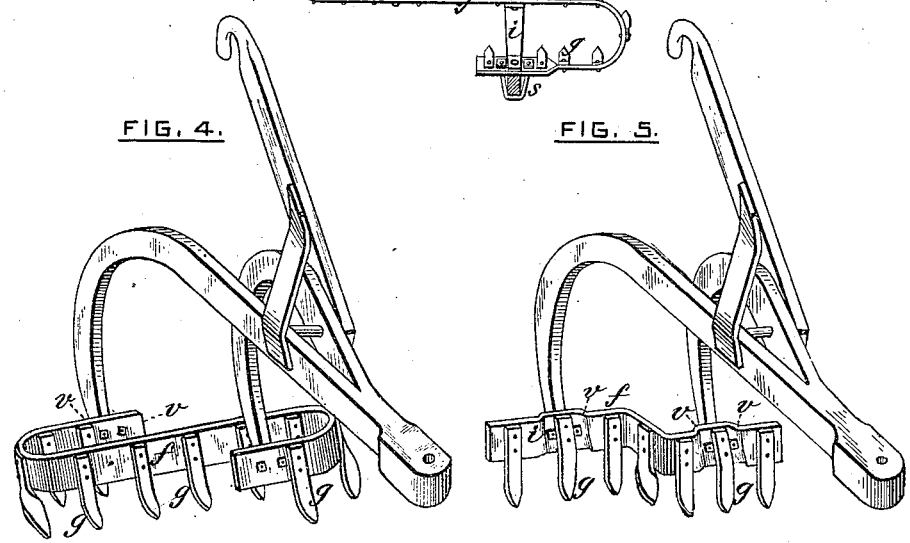
WITNESSES: INVENTOR:

UNITED STATES PATENT OFFICE.

THOMAS C. DODSWORTH, OF OTTAWA, KANSAS.

CULTIVATOR.

SPECIFICATION forming part of Letters Patent No. 258,724, dated May 30, 1882.

Application filed October 26, 1881. (No model.)

*To all whom it may concern:*

Be it known that I, THOMAS CHARLES DODSWORTH, a citizen of the United States, residing at Ottawa, in the county of Franklin and State of Kansas, have invented new and useful Improvements in Cultivators, of which the following is a specification.

My invention relates to wheeled cultivators in which divided plow-beams are pivoted to the arms of an arched or bent axle and adapted to carry cultivator-plows, one in advance of the other, upon a divided beam, the said beams being hung up in going to and from the field. With such a divided plow-beam I use interchangeably with the plowshares a curved or bent toothed bar adapted to be connected with and to extend between and in the space across the line of the standards, which are of long and short branches, of said divided beams, whereby the usual double cultivator - plow beams are formed into harrow-beams of toothed bars, which take the place of the cultivator-plows and are firmly supported and braced by and between the standards of the divided beam. The toothed bars stand at right angles to the line of the beams, and are attached to the lower ends of the curved standards by clips, whereby they are made interchangeable with the usual plow-beam shares in converting the wheeled cultivator into a wheeled harrow, using the curved standards of the pivoted beams for both the share and toothed bar attachments; and the particular improvements which I have made in such straddle-cultivator attachment will be the subject of specific claim.

Referring to the accompanying drawings, Figure 1 represents a top view of a wheeled cultivator with my improved bar-harrow attachment; Fig. 2, a side view of the same; Fig. 3, a rear view of the same; Fig. 4, the divided plow-beam with the bar-harrow attachment; and Fig. 5, a similar view, showing a modified form of harrow-bar. Fig. 6 shows the braces for the curved toothed bar, and Fig. 7 a top view of the toothed bar.

The drawings show the ordinary pivoted plow-beam cultivator with my harrow-bar attachment.

$a$ is the bent or elevated part of the axle, to the arms $b\ b$ of which the carrying-wheels are journaled. A frame, $c$, supports the elevated pole $d$, and is provided at its rear ends with laterally-extending hooks $e\ e$, upon which the pivoted plow-beams may be suspended above the ground in taking the machine to and from the field. The pole-frame is suitably braced to the axle-arms, and the pivoted beams are provided with the usual handles by which to control them in working between the rows of corn. The plow-beams are pivoted to the axle-arms in any suitable manner, and are divided so as to form a long and a short beam to carry the plowshares on curved standards, one in advance of the other, in the usual manner.

In using my improvement these plowshares are removed, and I attach by clips $s$ to the lower ends of the standards a toothed bar, $f$, curved or bent so as to stand across the space between the curved standards at right angles to the draft of the beam, so that the teeth $g$ stand between the standards and extend laterally beyond the standards. Each end of the bar is attached to the standard by a clip, $s$, and I prefer to have the bar of wrought-iron; but it may be of cast or malleable iron, in the form of the letter S, so that the teeth of the lapping ends will form double rows with the bar, the ends of which lap on opposite sides of the middle bar. The toothed bar, however, may be of angular form, as shown in Fig. 5, the bend being in the middle of its length and between the curved standards. This form will give only a single row of teeth; but, like the curved bar, it spans the space between the standards, and is attached by clips $s$ to their lower ends.

The teeth may be curved like cultivator-teeth; or they may be cutter-teeth curving rearward, or ordinary harrow-teeth.

A brace, $i$, connects each standard with the curved bar $f$, one of said braces being hooked under the clip at the rear side of the forward standard and bolted to that part of said bar which crosses in rear of said standard, while the other brace is bolted to the front side of the rear standard and to that part of the said bar which crosses in front of said standard. This renders the toothed bar firmly connected and braced to the curved standards. The angular toothed bar will be sufficiently braced by its angular middle part. To remove the toothed bars it is only necessary to unscrew the nuts $v$ which secure the clips $s$; and the plowshares can be attached to the curved standards in any suitable manner.

It will be understood that my toothed harrow-bar can be applied easily and used with a divided beam of a single-horse plow.

I do not claim broadly the combination of a harrow-frame attachment with the standards of a straddle-row cultivator, nor a continuous curved harrow-frame or double frame with harrow or cultivator teeth secured to long and short beam-standards, as such a construction is not new.

I claim—

In combination, the beams of a straddle-row cultivator, the single-tooth carrying-bar crossing between the beam-standards, having opposite return ends, the braces *i i*, secured to said bar between its return ends and its middle part, and the clips *s* for securing the ends to said beam-standards, substantially as set forth.

In testimony whereof I have hereunto set my hand in the presence of two subscribing witnesses.

THOMAS C. DODSWORTH.

Witnesses:
   THOS. F. WESTFALL,
   FRANK HETRICK.